United States Patent [19]

Trzeciak

[11] 3,778,546

[45] Dec. 11, 1973

[54] CRT DISPLAY OF A MOTION PICTURE FILM

[75] Inventor: John R. Trzeciak, Binghamton, N.Y.

[73] Assignee: The Singer Company, Binghamton, N.Y.

[22] Filed: Oct. 16, 1972

[21] Appl. No.: 297,899

Related U.S. Application Data

[63] Continuation-in-part of Ser. No. 174,110, Aug. 23, 1971, abandoned.

[52] U.S. Cl. .......................... 178/7.2, 178/DIG. 28

[51] Int. Cl. .......................... H04n 3/16

[58] Field of Search .......................... 178/7.2, DIG. 28

[56] References Cited

UNITED STATES PATENTS 2,291,723 8/1942 Jensen .......................... 178/DIG. 28

*Primary Examiner*—Robert L. Griffin
*Assistant Examiner*—George G. Stellar
*Attorney*—Andrew L. Bain

[57] ABSTRACT

The light spot of a flying spot scanner is directed upon a scanned frame of a motion picture film which is transported at a desired frame rate through the scanning field of the scanner. The light spot is deflected in response to horizontal and vertical deflection voltages provided to the scanner. The horizontal deflection voltage is proportional to the horizontal deflection of the beam of a cathode ray tube whereon a viewing raster is traced. The vertical deflection voltage is provided by a summing amplifier which has one input connected to a signal proportional to the vertical deflection of the beam and the other input connected to the output of an integrator circuit which provides a displacement signal proportional to the integral of the frame rate. In response to the deflection signals, the spot of the scanner traces a scanning raster which is shifted to compensate for the frame rate of a scanned frame. Disposed to receive light emanating from the scanned frame is a photomultiplier which provides a video signal proportional to the emanating light to the cathode ray tube, thereby displaying the scanned frame thereon. In response to the displacement signal being greater or equal to a signal representative of the scanned frame leaving the scanning field during the vertical retrace of the scanning raster, the integrator circuit is reset to provide a displacement signal representative of the displacement of a succeeding frame in the scanning field.

7 Claims, 3 Drawing Figures

CRT DISPLAY OF A MOTION PICTURE FILM

This is a continuation-in-part of the U.S. Pat. application having Ser. No. 174,110 filed Aug. 23, 1971, now abandoned.

BACKGROUND OF THE INVENTION

1. Field of the Invention

This invention relates to the display of the frames of a motion picture film, and more particularly to apparatus for providng on a display surface a display of frames of a film which are transported at any desired frame rate.

2. Description of the Prior Art

In a flight simulator, the simulation of the view from an aircraft may be provided by apparatus which comprises a motion picture film taken from an actual aircraft while in flight. In a display of the motion picture film, the film may be transported at a frame rate related to the simulated speed of the aircraft.

A cathode ray tube, (CRT) because of its low cost and flexibility, is most often used for providing displays in a simulated aircraft. Typically, the beam of the CRT is deflected across the face thereof to trace a multiplicity of evenly spaced horizontal lines from the left side to the right side of the face. After a line is traced, the beam is rapidly deflected from the right side to the left side of the face at a slightly lower vertical location whereby a succeeding line may be traced. The rapid left to right deflection is referred to as a horizontal retrace. During the horizontal retrace, the CRT is biased below cutoff (referred to as horizontal blanking) whereby the trace of the beam is prevented from appearing on the face. After the bottom line is traced, the beam is rapidly deflected to the upper left hand corner of the CRT where a succeeding horizontal line may be traced across the top of the face. The rapid deflection from the lower right to the upper left corner of the face is referred to as a vertical retrace. During the vertical retrace the CRT is biased below cutoff (referred to as vertical blanking) whereby the trace of the beam is prevented from appearing on the face.

The array of horizontal lines referred to hereinbefore is known in the art as a raster. Typically, the lines of a complete raster are traced 60 times per second in response to horizontal and vertical sync pulses provided by a sync generator. In providing an image of the face of the CRT, selected portions of selected raster lines are brightened to a desired intensity in response to a video signal.

It should be understood that motion pictures are typically transported at a frame rate of 24 frames per second. The matter on the film may be displayed on a CRT by optically scanning the film with a light spot in synchronism with the tracing of the lines of the raster and providing a video signal in accordance with the intensity of light emanating from the film. Because of the difference of the frame rate from the raster rate, the light spot traces rasters on two frames of the film while five rasters are traced on the face of the CRT. However, because the frame rate of a film may be at any of a multiplicity of frame rates, in simulating the view from an aircraft the typical apparatus for a CRT display of a film is inapplicable.

Heretofore, the display of a motion picture film which is transported at any desired speed has been provided by apparatus which is costly, complex and unreliable.

SUMMARY OF THE INVENTION

The principal object of the present invention is to provide on a viewing surface a display of the frames of a motion picture film which is transported at a desired frame rate.

According to the present invention, in response to a drive signal, an integrator generates a displacement signal proportional to the integral of the frame rate of an image bearing medium and a drive unit transports the film at a desired frame rate through the scanning field of an optical scanner which provdes a light spot upon a scanned frame of said medium; the light spot is deflected in proportion to horizontal and vertical deflection signals respectively proportional to the horizontal deflection of a beam on a viewing surface and the sum of the vertical deflection of the beam and said displacement signal; in response to said displacement signal being at least equal to a reference signal, said integrator is reset to change said displacement signal to correspond to the displacement of a succeeding frame in the scanning field.

The present invention provides apparatus for deflecting the light spot of an optical scanner to provide a scanning raster for scanning frames of a motion picture film in a scanning field by vertically displacing the scanning raster in accordance with the integral of the frame rate of the film. When a scanned frame is about to pass from the scanning field, the light spot may be deflected during a vertical retrace of the scanning rester to scan a succeeding frame whereby each scanning raster scans an entire frame.

Other objects, features and advantages of the present invention will become more apparent in light of the following detailed description of a preferred embodiment thereof as illustrated in the accompanying drawing.

DESCRIPTION OF THE PREFERRED EMBODIMENT

In the present invention, the frame of an image bearing medium, such as a motion picture film, is scanned by the light spot of a flying spot scanner which traces a scanning raster which is shifted to compensate for the frame rate of the scanned frame within the field of the scanner. Light emanates from the scanned frame in accordance with the opacity of the medium. In response to a portion of the scanned frame being about to pass from the scanning field and a succeeding frame entering the scanning field, the succeeding frame is scanned; the response is referred to as indexing.

Figure 1:
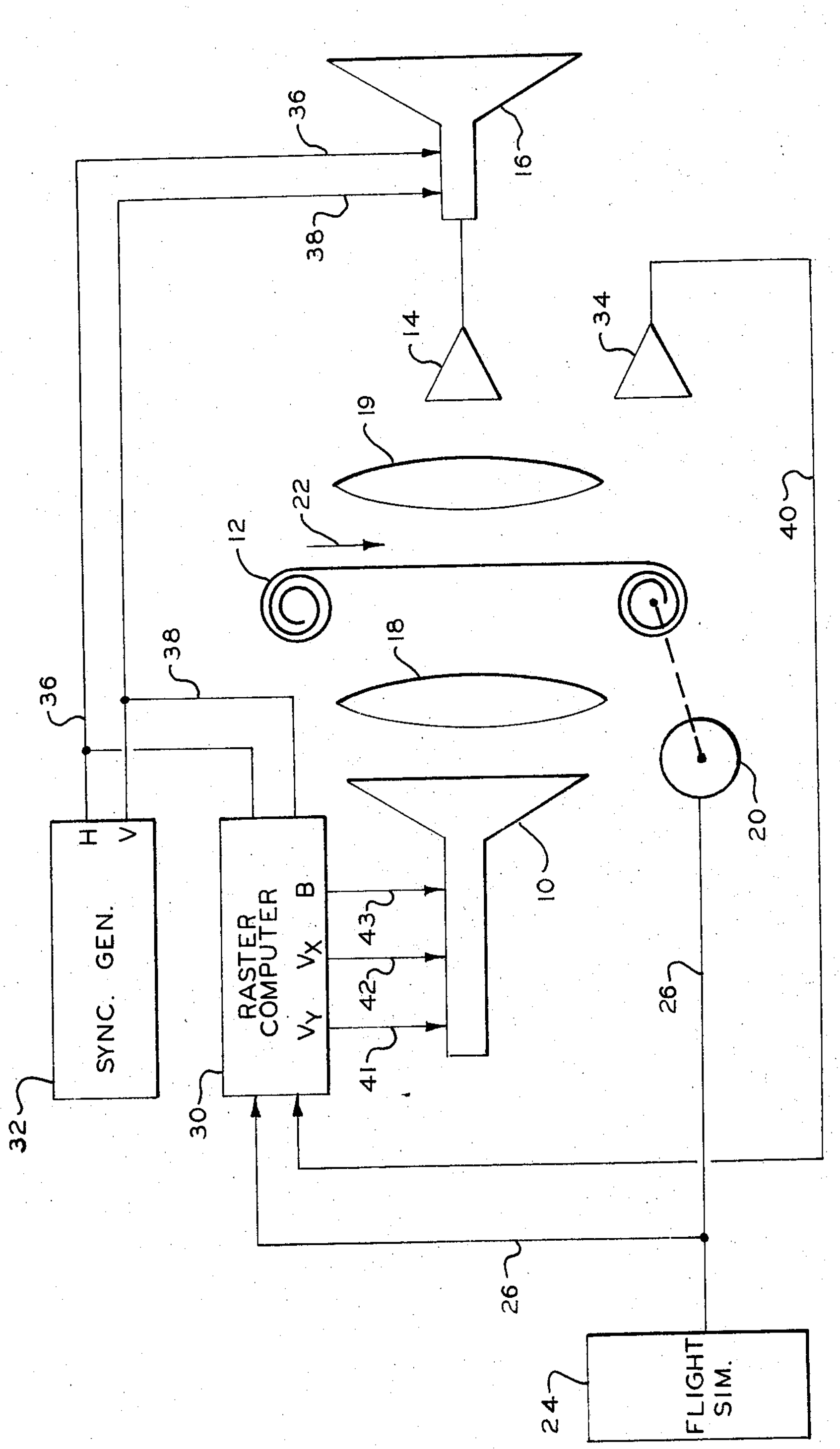
FIG. 1 is a block diagram of the preferred embodiment of the present invention.

Referring now to FIG. 1, a flying spot scanner 10 provides a spot of light which is directed through a frame of a motion picture film 12 to the optical input of a photomultiplier tube 14 which has an output connected to the video input of a display 16. A video signal proportional to the intensity of the light emanating from the frame is provided by the photomultiplier tube 14 to the video input of the display 16. A lens 18 focuses the light spot upon the film 12 and a lens 19 focuses the light emanating from the film 12 upon the input of the photomultiplier tube 14.

A servo drive unit 20 transports the film 12 in a direction indicated by an arrow 22 thereby successively transporting the frames of the film 12 into the scanning field of the scanner 10. A drive voltage proportional to a desired frame rate of the film 12 is provided to the drive unit 20 by a flight simulator 24 through a signal line 26. In response to the drive voltage, the film 12 is transported at the desired frame rate. In this embodiment, the time for a frame to traverse the scanning field is always much less than the time for the light spot to traverse the portions of the frame from the first to the last lines of the scanning raster.

The drive voltage on the line 26 is also provided to an input of a raster computer 30. Other inputs of the raster computer 30 are connected to a sync generator 32 and an indexing photomultiplier 34 similar to the photomultiplier 14, through signal lines 36, 38 and a signal line 40, respectively. The sync generator 32 provides horizontal and vertical sync pulses to the raster computer 30. The photomultiplier 34 is disposed to provide to the raster computer 30 sprocket signals in response to the light spot being directed through sprocket holes of the film 12. In response to the drive voltage, the horizontal and vertical sync pulses and the sprocket signals, the raster computer 30 provides a vertical scanning deflection voltage and a horizontal scanning deflection voltage to the scanner 10 through lines 41, 42 and blanking pulses to the scanner 10 through a signal line 43 The deflection voltages cause the light to trace the scanning raster and the blanking pulses blank the display 16 during retraces of the scanning raster. The lines 36, 38 are also respectively connected to the scanner 10 whereby horizontal and vertical sync signals are provided for the generation of a viewing raster traced by a beam on a viewing surface (such as the face of a CRT).

In the scanning raster, the first line is traced horizontally along the bottom of the scanned frame (the portion of the frame that first leaves the scanning field); successive lines are traced along successively higher portions of the scanned frame. Since the speed of the vertical deflection of the light spot is much greater than the frame rate, when the light spot starts to trace a scanning raster the entire scanned frame is always scanned.

Figure 2:
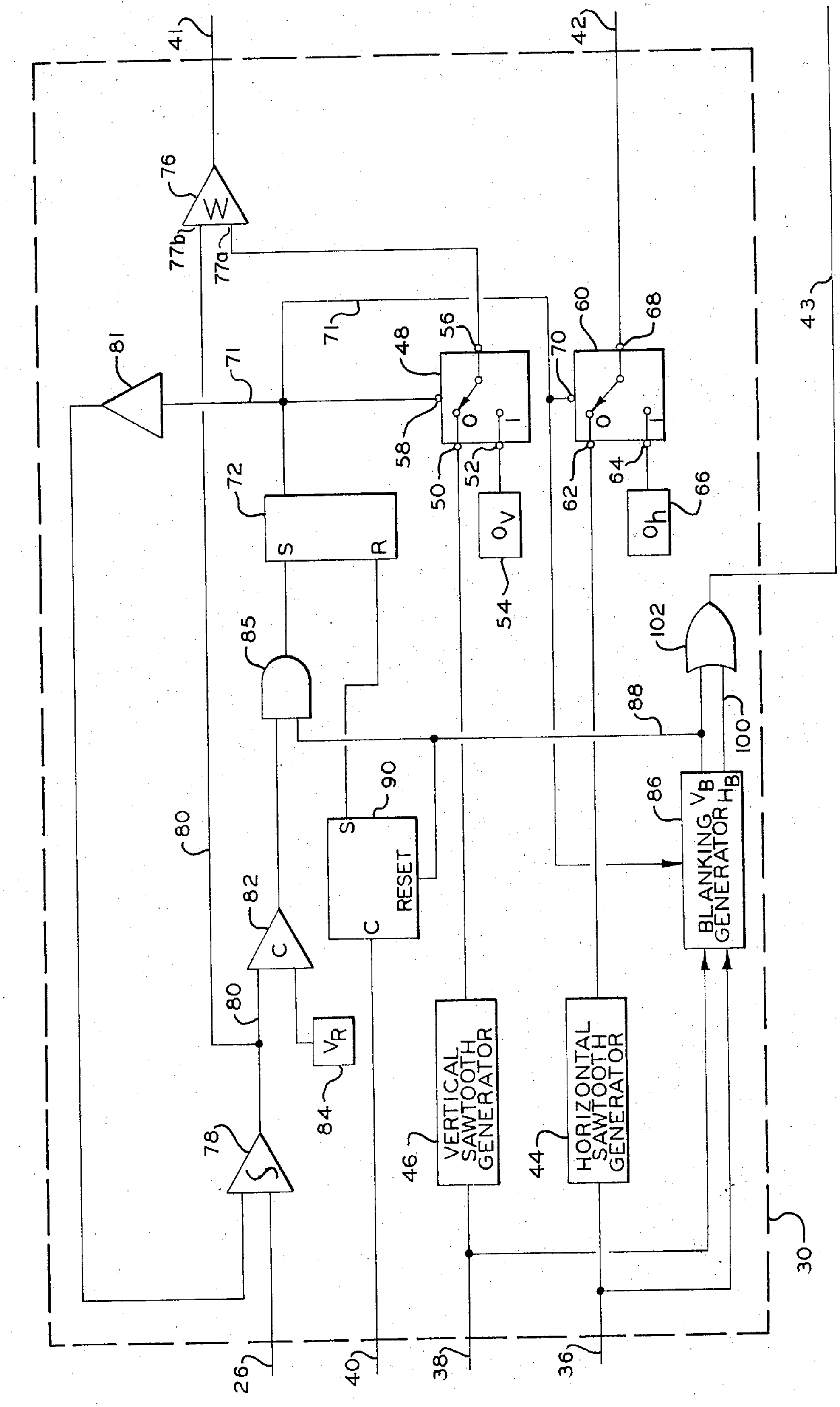
FIG. 2 is a schematic block diagram of a raster computer which may be used in the preferred embodiment of FIG. 1.

Referring now to FIG. 2, the raster computer 30 is comprised of horizontal and vertical deflection generators 44, 46 which have inputs provided through the lines 36, 38 respectively. In response to the sync pulses provided thereto, the generators 44, 46 generate horizontal and vertical sawtooth voltages proportional to corresponding CRT deflection voltages which generate the viewing raster. The output of the generator 46 is connected to an analog switch 48 at a first switch terminal 50 thereof. A second switch terminal 52 of the switch 48 is connected to the output of a vertical offset voltage source 54 ($O_v$). The switch 48 is typically a semiconductor device which provides at a switch pole terminal 56 the voltage at the terminal 50 in response to a logic voltage of approximately zero volts (referred to as ZERO hereinafter) applied to a terminal 58. In response to a logic voltage of approximately 3.5 votls (referred to as ONE hereinafter) applied to the terminal 58, the voltage at the terminal 52 is provided at the terminal 56.

An analog switch 60, similar to the switch 48, has first and second switch terminals 62, 64 connected to the output of the generator 44 and the output of a horizontal offset voltage source 66 ($O_h$), respectively. The switch 60 provides at a switch pole terminal the voltages at the terminals 62, 64 in response to ZERO and ONE applied, respectively, to a termianl 70.

Figure 3:
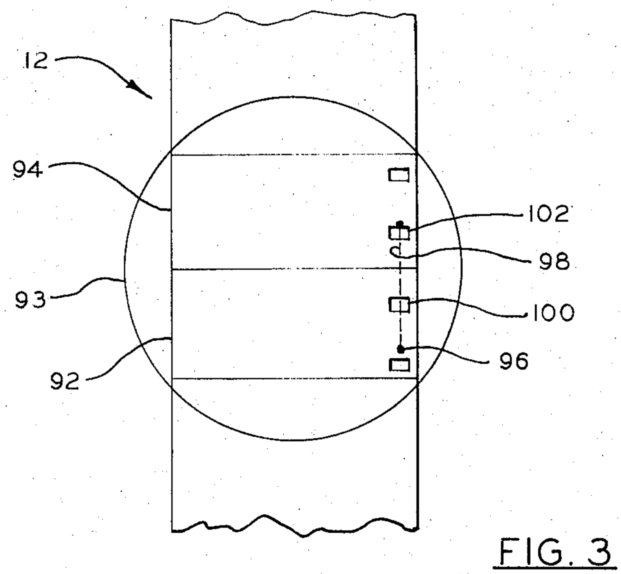
FIG. 3 is a front elevation of a scanned frame and a succeeding frame of the film in the scanning field.

The termianls 58, 70 are both connected to the output of an indexing flip-flop 72 through a signal line 71. As explained hereinafter, the flip-flop 72 provides an indexing logic signal of ZERO whenever a frame is being scanned and ONE during the indexing referred to herebefore. The terminals 56, 60 are respectively connected to a summing amplifier 76 at an input **77*a* thereof and to the line 42. Accordingly, whenever a frame is being scanned, the outputs of the generators 44, 46 are respectively provided through the switch 48 to the horizontal deflection input of the scanner 10 (FIG. 2) and through the switch 68 to the amplifier 76 (FIG. 3). Therefore, the generator 44** generates the horizontal scanning deflection voltage.

An input **77*b* of the amplifier 76 is connected to the output of an integrator 78 through a signal line 80. The amplifier 76 is of the type which provides an output voltage proportional to the sum of the voltages applied to the inputs 77*a*, 77*b*. As explained hereinafter, the integrator 78 provides a displacement voltage proportional to the transportation displacement of the frame in the scanning field. According to the present invention, the amplifier 76 provides to the scanner 10 (FIG. 1) a vertical scanning deflection voltage which is proportional to the sum of the vertical sawtooth voltage and the displacement voltage. The provision of the displacement voltage to the input 77*b* causes the scanning reaster to shift to compensate for the frame rate of the scanned frame. It should be understood that the light spot of the scanner 10 traces the scanning raster referred to hereinbefore in response to the scanning deflection voltages. It should also be understood that the scanning and viewing rasters are in synchronism whereby the middle of the fourth line from the bottom of the viewing raster, for example, corresponds to the middle of the fourth line from the bottom of the scanning raster. Because of the synchronism of the rasters, brightening of the beam in proportion to the video signal (provided by photomultiplier tube 14**) provides the image of the scanned frame on the viewing surface.

The integrator 78 (FIG. 2) has two inputs respectively connected to the line 26 (drive voltage) and the output of a reset amplifier 81 which provides a reset voltage. The integrator 78 is of the type which provides an output voltage proportional to the time integral of the sum of the voltages applied to the inputs thereof. As is well known in the art, the time integral of a velocity (such as a frame rate) is a displacement. Therefore, the time integral of the drive voltage is proportional to the displacement of the film 12. During the indexing referred to hereinbefore the amplifier 81 provides a voltage which resets the integrator 78 causing therefrom a displacement of the succeeding frame. Thereafter, the amplifier 81 provides zero and the integrator 78 provides the displacement voltage to shift the scanning raster to compensate for the frame rate of the scanned frame.

The output of the integrator 78 is connected to one of two inputs of a comparator 82 through the line 80. The other input of the comparator 82 is connected to a reference voltage source 84 which provides a reference voltage. The comparator 82 provides ONE in response to the displacement voltage being greater or equal to the reference voltage; ZERO is provided in response to the displacement voltage being less than the reference voltage. In the present invention, the displacement voltage equalling the reference voltage is representative of the scanned frame being about to pass from the scanning field. Therefore, ONE provided by the comparator 82 is an indexing signal initially representative of a scanned frame about to pass from the scanning field.

The output of the comparator 82 is connected to one of two inputs of an AND gate 85. The other input of gate 85 is connected to a blanking generator 86 through a signal line 88. The generator 86 provides a ONE on the line 88 during the vertical retrace of the light spot. In response to ONEs being con-currently provided by the comparator 82 and on the line 88, the gate 85 provides ONE at its output. The concurrent provision of the ONEs is representative of the completion of the scan of the raster on a scanned frame about to pass from the scanning field. In this embodiment, indexing is provided in response to the concurrent provision of the ONEs thereby indexing only during a vertical retrace of the scanning raster.

The output of the gate 85 is connected to the set input of the flip-flp 72. The reset input of the flip-flop 72 is connected to the output of a binary counter 90 which has a reset input connected to the generator 86 through the line 88. In response to the vertical blanking pulses provided through the line 88, the counter 90 is reset to provide ZERO to the flip-flop 72. In response to ONE and ZERO being respectively provided to the set and reset inputs of the flip-flop 72, ONE is the indexing logic signal provided at the output thereof. Thereafter, the indexing logic signal changes to ZERO, in response to ZERO and ONE being respectively provided to the set and reset inputs of the flip-flop 72.

In response to the indexing logic signal being ONE, the switches 48, 60 provide the vertical and the horizontal offset voltages to the amplifier 76 and the line 42 respectively and the amplifier 81 provides a reset voltage much larger than, and of opposite polarity from, the drive voltage. As is known to those skilled in the art, the displacement voltage is substantially equal to the reference voltage provided by the source 84 at the initial time of, and immediately after, the application of the reset voltage to the integrator 78 because the displacement voltage is proportional to a time integral.

Referring now to FIGS. 2 and 3, a scanned frame 92 (FIG. 3) is about to pass from a scanning field 93 of the scanner 10 (FIG. 1) and succeeding frame 94 (FIG. 3) has entered the field 93. In concurrent response to the displacement voltage (substantially equal to the reference voltage) and the horizontal offset voltage ($O_h$), the light spot is initially deflected to a point 96 on the frame 92. which is in a vertical alignment with sprocket holes of the frames of the film 12. The application of the reset voltage to the integrator 78 (FIG. 2) to provide a displacement voltage which is reduced at a substantially constant rate. In response thereto, the amplifier 76 provides a vertical scanner deflection voltage ($O_v$) which causes the light spot to traverse a path represented by the line 98 (FIG. 3). The counter 90 (FIG. 2) is incremented twice by the sprocket signals provided by the photomultiplier 34 (FIG. 1) in response to the light spot passing through a first sprocket hole 100 (FIG. 3) and a second sprocket hole 102. In response to the light spot passing through the second sprocket hole 102, the counter 90 (FIG. 2) provides ONE to the reset input of the flip-flop 72.

It should be understood that the reduced displacement voltage is substantially below the reference voltage thereby causing the comparator 82 to provide ZERO. According to the present invention, when ONE is provided by the counter 90 the reduced displacement voltage is representative of the transportation displacement of the succeeding frame. In response to ZERO and ONE respectively applied by the comparator 82 and the counter 90 to the set and reset inputs of the flip-flop 72, ZERO is provided on a line 71. In response to the next succeeding vertical blanking pulse, the counter 90 is reset, and the switches 48, 60 respectively provide at the terminals 56, 68 the outputs of the generators 46, 44. Accordingly, the raster computer 30 is conditioned to trace a raster on the frame in the scanning field and be indexed to the next succeeding frame when a portion of the scanned frame is about to pass from the scanning field.

The blanking generator 86 provides the vertical blanking pulses on the line 88 in response to sync pulses provided on the lines 36, 38 and ZERO provided on the line 71 connected thereto. During the horizontal retrace time ONE is provided by the generator 86 on a line 100. The lines 88, 100 are connected to the inputs of an OR gate 102. In response to ONE being provided on either the line 88 or the line 100 the gate 102 provides a blanking pulse to the scanner 10 for preventing the light spot from being directed to the film 12 during horizontal and vertical retrace of the raster.

Thus there has been shown apparatus for displaying on a CRT the frames of a film which has a desired frame rate.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. In the method of displaying images of respective frames of an image bearing medium where an image is in accordance with the opacity of said medium, said frames being transported at a desired frame rate through a scanning field of an optical scanner where a light spot is directed upon a receiving side of a scanned frame, a video signal proportional to light emanating from a transmission side thereof being provided to a display where a beam traces a viewing raster on a viewing surface, the steps of:

generating a displacement signal having a value proportional to the time integral of said frame rate;

deflecting said light spot vertically in proportion to the sum of the vertical deflection of said display beam and the value of said displacement signal and horizontally in proportion to the horizontal deflection of said display beam, whereby a scanning raster is traced by said light spot.

comparing said displacement signal to a reference signal having a value representative of the displacement of a scanned frame which is about to pass from the scanning field; and resetting said displacement signal to a value corresponding to the displacement of the succeeding frame to be scanned by said light spot in response to the value of said displacement signal being at least equal to the value of said reference signal.

2. The method of claim 1 wherein said medium is a motion picture film and the step of resetting takes place during the vertical retrace of said scanning raster including the steps of:

first providing a horizontal offset deflection of said light spot to an alignment with sprocket holes of the frames of said film;

then altering the value of said displacement signal in proportion to the time integral of a reset signal; and sensing light from said light spot being provided through a sprocket hole thereby indicating that the value of said displacement signal is altered to correspond to the displacement of a succeeding frame within said scanning field.

3. The method of claim 1 wherein the steps of deflecting includes deflecting said light spot to trace the first horizontal line of said scanning raster across the portion of said scanned frame which first passes from the scanning field and tracing successive lines along portions of said scanned frame which respectively leave the scanning field at successively later times.

4. Apparatus for displaying images of respective frames of an image bearing medium where an image is in accordance with the opacity of said medium, said medium being transported by a drive unit at a desired frame rate through a scanning field of an optical scanner which provides a light spot to a receiving side of a scanned frame within said scanning field, the image of said scanned frame being displayed on a display of the type where a beam traces a viewing raster on a viewing surface comprising:

means connected to said display which are disposed to receive light emanating from a transmission side of said scanned frame, said means providing to said display a video signal representative of the intensity of said emanating light;

integrator means connected for response to said drive unit for providing a displacement signal having a value proportional to the time integral of said frame rate;

a reference signal source for providing a reference signal having a value representative of the displacement of a scanned frame which is about to pass from the scanning field;

comparison means connected to said integer means and reference signal source for providing a comparison signal indicative of the value of said displacement signal being at least equal to the value of said reference signal;

resetting means connected to said comparison means and said integrator means for resetting said integrator means to change said displacement signal to a value corresponding to the displacement of a succeeding frame in said scanning field in response to said comparison signal whereby said succeeding frame becomes said scanned frame;

generating means for providing horizontal and vertical sawtooth signals having amplitudes respectively proportional to the horizontal and vertical displacement of said display beam on said viewing surface; and deflection means connected to said integrator means, said generating means and said scanner for vertically and horizontally deflecting to said light spot to trace a scanning raster in concurrent response to said sawtooth signals and said displacement signal, said light spot being vertically deflected in proportion to the sum of the value of said displacement signal and the vertical deflection of said display beam and horizontally deflected in proportion to the horizontal deflection of said display beam.

5. Apparatus according to claim 4 wherein said resetting means resets said integrator means during a vertical retrace of said scanning raster.

6. Apparatus according to claim 4 wherein said medium is a motion picture film, said resetting means comprising:

photomultiplier means disposed to receive light from a sprocket hole of said film and provide a sprocket signal in response thereto;

counting means connected to said photomultiplier means for providing a counter signal in response to a sprocket signal indicative of said displacement signal having a value representative of said succeeding frame; and means connected for response to said comparison and counter signals for applying a reset input signal to the input of said integrator means in response to said comparison signal, said reset signal being applied until said counter signal is provided.

7. Apparatus according to claim 4 wherein said resetting means provides first and second indexing signals, said first index signal being provided contemporaneously with the resetting of said integrator means, said second index signal being indicative of said displacement signal being representative of said scanned frame, said deflection means comprising:

a source of a vertical offset signal;

a source of a horizontal offset signal;

vertical switching means connected to said vertical offset source and said reset means for providing to said scanner a vertical deflection signal having a value proportional to the sum of the values of said displacement and said vertical offset signals in response to said first indexing signal, said vertical deflection signal having a value proportional to the sum of the values of said displacement signal and the amplitude of said vertical sawtooth signal in response to said second indexing signal; and horizontal switching means connected to said horizontal offset source for providing a horizontal deflection signal having a value proportional to the sum of the values of said horizontal offset and horizontal sawtooth signals in response to said first indexing signal, said horizontal deflection signal having a value proportional to said horizontal sawtooth signal in response to said second indexing signal.

* * * * *

UNITED STATES PATENT OFFICE

CERTIFICATE OF CORRECTION

Patent No. 3,778,546 Dated December 11, 1973

Inventor(s) John R. Trzeciak

It is certified that error appears in the above-identified patent and that said Letters Patent are hereby corrected as shown below:

Column 1, line 46, "of" should be --on--.

Column 4, line 15, "60" should be --68--;
line 19, "48" should be --60--;
line 21, "(FIG. 2)" should be --(FIG. 1)-- and "68" should be --48--;
line 22, "(FIG. 3)" should be --(FIG. 2)--;
line 37, "reaster" should be --raster--; and
line 63, after "displacement" insert --voltage corresponding to the displacement--.
Column 5, line 61, delete period, ".", after "92".
Column 7, line 54, change "integer" to --integrator--.

Signed and sealed this 17th day of September 1974.

(SEAL)
Attest:

McCOY M. GIBSON, JR.
Attesting Officer

C. MARSHALL DANN
Commissioner of Patents